US012586850B2

(12) United States Patent
Akiyama

(10) Patent No.: US 12,586,850 B2
(45) Date of Patent: Mar. 24, 2026

(54) POWER STORAGE DEVICE

(71) Applicant: KABUSHIKI KAISHA TOYOTA JIDOSHOKKI, Kariya (JP)

(72) Inventor: Hirokuni Akiyama, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 874 days.

(21) Appl. No.: 17/790,556

(22) PCT Filed: Dec. 7, 2020

(86) PCT No.: PCT/JP2020/045536
§ 371 (c)(1),
(2) Date: Jul. 1, 2022

(87) PCT Pub. No.: WO2021/140808
PCT Pub. Date: Jul. 15, 2021

(65) Prior Publication Data
US 2023/0029819 A1 Feb. 2, 2023

(30) Foreign Application Priority Data

Jan. 9, 2020 (JP) ................................ 2020-002182

(51) Int. Cl.
*H01M 50/204* (2021.01)
*H01G 11/80* (2013.01)
(Continued)

(52) U.S. Cl.
CPC .......... *H01M 50/204* (2021.01); *H01G 11/80* (2013.01); *H01M 10/0585* (2013.01); (Continued)

(58) Field of Classification Search
CPC ............. H01M 50/204; H01M 10/613; H01M 10/6556; H01M 50/296; H01M 50/342; (Continued)

(56) References Cited

U.S. PATENT DOCUMENTS 10,490,797 B2 * 11/2019 Shimizu ................ H01M 50/50
10,744,878 B2 * 8/2020 Yao ..................... H01M 50/242
(Continued)

FOREIGN PATENT DOCUMENTS

CN 110114927 A 8/2019
EP 2924761 B1 * 6/2018 ........ H01M 10/0431
(Continued)

OTHER PUBLICATIONS

International Search Report for PCT/JP2020/045536 dated, Jan. 19, 2021 (PCT/ISA/210).
(Continued)

*Primary Examiner* — Milton I Cano
(74) *Attorney, Agent, or Firm* — Sughrue Mion, PLLC

(57) ABSTRACT

A power storage device includes: a module stacked body including at least one power storage module including a plurality of stacked electrodes; and a housing constituting a first sealed space for accommodating the module stacked body, wherein the housing has a housing body including a cylindrical side wall extending along a stacking direction in the module stacked body and a plate-shaped bottom wall closing one end of the side wall and a lid being joined to the other end of the side wall and constrains the module stacked body in the stacking direction of the electrode inside the first sealed space by deforming at least a portion of the bottom wall and the lid so as to come close to each other due to an air pressure difference between the inside and outside of the first sealed space.

16 Claims, 4 Drawing Sheets

(51) Int. Cl.

| | | |
|---|---|---|
| *H01M 10/0585* | (2010.01) | |
| *H01M 10/613* | (2014.01) | |
| *H01M 10/6556* | (2014.01) | |
| *H01M 50/271* | (2021.01) | |
| *H01M 50/296* | (2021.01) | |
| *H01M 50/342* | (2021.01) | |

(52) U.S. Cl.
CPC ..... *H01M 10/613* (2015.04); *H01M 10/6556* (2015.04); *H01M 50/271* (2021.01); *H01M 50/296* (2021.01); *H01M 50/3425* (2021.01)

(58) Field of Classification Search
CPC ........... H01M 50/271; H01M 10/0585; H01M 50/202; H01M 50/258; H01M 10/0422; H01M 10/0468; H01M 4/366; H01M 10/058; H01M 10/60; H01M 50/289; H01M 10/052; H01M 10/4257; H01M 10/655; H01M 10/6568; H01M 10/42; H01M 50/3425; H01G 11/80
See application file for complete search history.

(56) References Cited

U.S. PATENT DOCUMENTS

| | | | | |
|---|---|---|---|---|
| 11,697,504 B2 * | 7/2023 | Obrist | ................... | H01M 50/24 |
| | | | | 429/61 |
| 2004/0146777 A1 * | 7/2004 | Forlino | ................ | H01M 10/52 |
| | | | | 429/122 |
| 2019/0334195 A1 | 10/2019 | Minagata et al. | | |
| 2020/0411819 A1 * | 12/2020 | Seki | ................... | H01M 50/269 |

FOREIGN PATENT DOCUMENTS

| | | | |
|---|---|---|---|
| EP | 3723157 A1 * | 10/2020 | |
| JP | 2009-117105 A | 5/2009 | |
| JP | 2013-84459 A | 5/2013 | |

OTHER PUBLICATIONS

International Preliminary Report on Patentability dated Jul. 12, 2022 with a Translation of the Written Opinion of the International Searching Authority in Application No. PCT/JP2020/045536.

* cited by examiner

POWER STORAGE DEVICE

CROSS REFERENCE TO RELATED APPLICATIONS

This application is a National Stage of International Application No. PCT/JP2020/045536 filed Dec. 7, 2020, claiming priority based on Japanese Patent Application No. 2020-002182 filed Jan. 9, 2020.

TECHNICAL FIELD

This disclosure relates to a power storage device.

BACKGROUND ART

There is known a power storage device including a plurality of bipolar batteries (for example, Patent Document 1). In the power storage device, the plurality of bipolar batteries is stacked on each other with a current collector interposed therebetween.

CITATION LIST

Patent Literature

Patent Literature 1: Japanese Unexamined Patent Publication No. 2009-117105

SUMMARY OF INVENTION

Technical Problem

It is considered that, when a power storage module is configured with a bipolar battery, a plurality of stacked power storage modules is constrained by a predetermined pressing force in a stacking direction. In this case, it may take time and effort to constrain the plurality of stacked power storage modules. There is a demand for a technique for more easily constraining the plurality of power storage modules.

The present disclosure provides a power storage device capable of easily constraining a stacked body in which a plurality of power storage modules are stacked.

Solution to Problem

A power storage device according to one aspect of the present disclosure includes: a module stacked body including at least one power storage module including a plurality of stacked electrodes; and a housing constituting a first sealed space for accommodating the module stacked body, wherein the housing has a housing body including a cylindrical side wall extending along a stacking direction in the module stacked body and a plate-shaped bottom wall closing one end of the side wall and a lid being joined to the other end of the side wall and constrains the module stacked body in the stacking direction of the electrode inside die first sealed space by deforming at least a portion of the bottom wall and the lid so as to come close to each other due to an air pressure difference between the inside and outside of the first sealed space.

In the above-mentioned power storage device, at least a portion of the bottom wall and the lid is deformed so as to come close to each other due to the air pressure difference between the inside and outside of the first sealed space, and the module stacked body is constrained by this deformed housing. That is, the module stacked body is constrained only by allowing the air pressure difference inside and outside the first sealed space to occur in a state where the module stacked body is arranged in the first sealed space.

The power storage device may further include an intermediate member arranged between an inner wall surface of the housing and the module stacked body, the intermediate member may have a deformable package having a second sealed space inside, the second sealed space may contain at least a gas, and an air pressure of the first sealed space may be lower than the air pressure in the second sealed space. In this configuration, the intermediate member arranged between the inner wall surface of the housing and the module stacked body is deformed so as to expand due to an air pressure difference between the first sealed space and the second sealed space. Accordingly, the intermediate member can function as a damper.

The lid may include a plate-shaped central portion and an easily-deformable portion formed on a peripheral edge of the central portion, and the easily-deformable portion may have a lower stiffness than the central portion. In this configuration, the module stacked body can be appropriately interposed between the plate-shaped central portion and the plate-shaped bottom wall while deformability of the housing is ensured by the easily-deformable portion having low stiffness.

An adsorbent adsorbing gas may be provided inside the first sealed space. In this configuration, the adsorbent adsorbs the gas inside the first sealed space, so that a fluctuation of the air pressure inside the first sealed space can be suppressed.

An electronic device electrically connected to the module stacked body may be arranged inside the first sealed space. In this configuration, since the number of wires going out from the inside of the housing is reduced, airtightness inside the housing is easily maintained.

The dimension of the electronic device in the stacking direction may be smaller than the dimension in the stacking direction between portions of the bottom wall and the lid constraining the module stacked body. In this configuration, when a constraint load is applied to the module stacked body, the constraint load is suppressed from being applied to the electronic device.

The side wall of the housing may include a first side wall adjacent to the electronic device, and the first side wall may be thicker than the lid and the bottom wall. In this configuration, a portion of the housing corresponding to the electronic device is not easily deformed, so that damage to the electronic device is reduced.

An inner surface of the bottom wall may have a step difference allowing a position where the module stacked body is provided to be lower than a position where the electronic device is provided. In this configuration, the module stacked body and the electronic device can be easily arranged predetermined positions.

The side wall of the housing may be provided with a valve opening when a pressure of the first sealed space becomes equal to or higher than an atmospheric pressure. In this configuration, the pressure inside the housing can be adjusted by using an inexpensive valve.

The thickness of the bottom wall at a position where the module stacked body is provided may be smaller than the thickness of other portions of the bottom wall. In this case, the bottom wall is easily deformed at the position where the module stacked body is provided.

The housing may be provided with a decompression pump for decompressing the first sealed space with respect to an atmospheric pressure. In this configuration, the inside of the housing can be maintained in a decompressed state.

Advantageous Effects of Invention

According to the present disclosure, a power storage device capable of easily constraining a stacked body m which a plurality of power storage modules is stacked can be provided.

DESCRIPTION OF EMBODIMENTS

Figure 1:
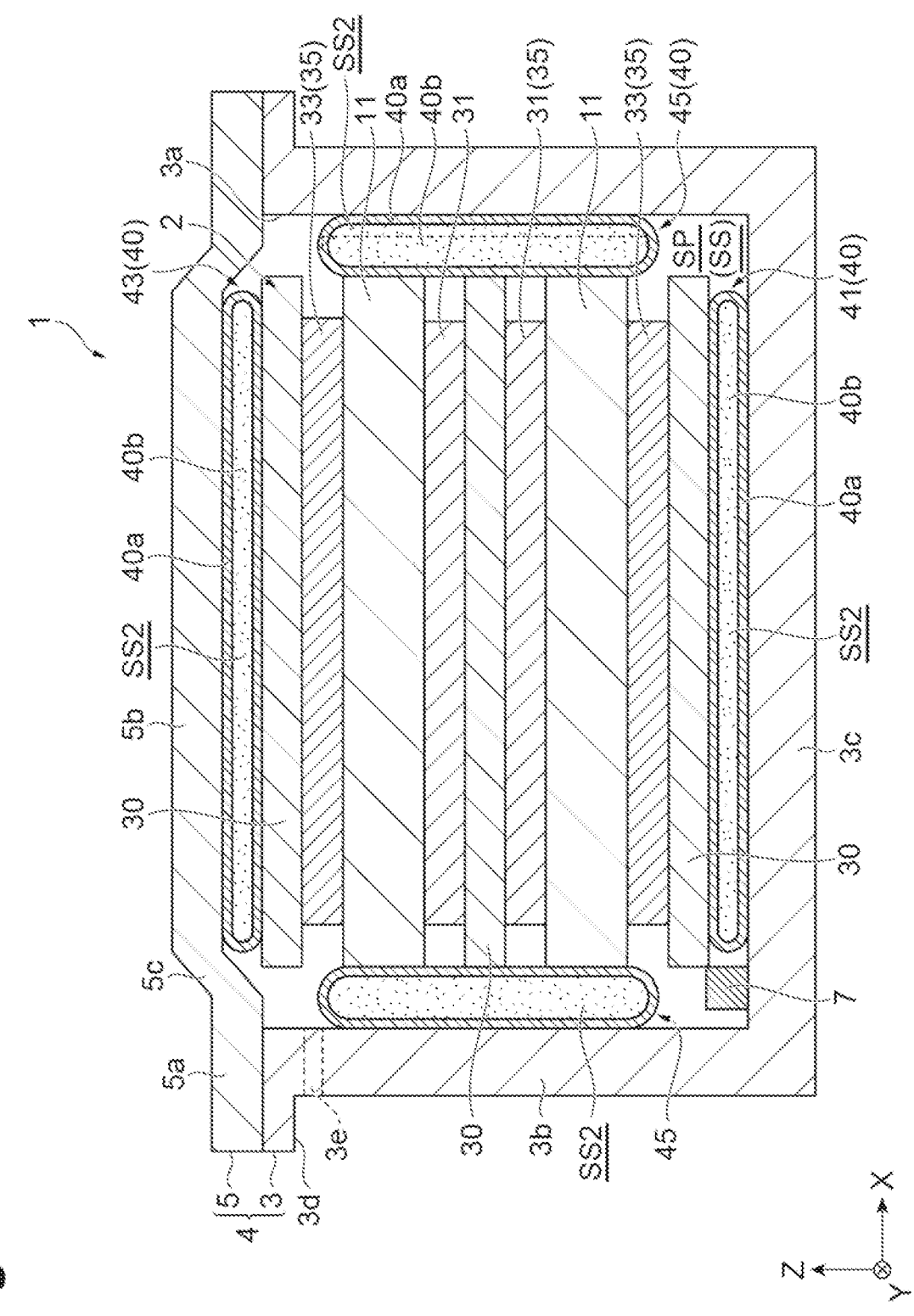
FIG. 1 is a schematic cross-sectional view illustrating a power storage device according to an example.

Hereinafter, embodiments of the present disclosure will be described in detail with reference to the accompanying drawings. In the description of the drawings, the same reference numerals are used for the same or equivalent elements, and duplicate description is omitted.

A power storage device 1 illustrated in FIG. 1 can be used as a battery for various vehicles such as forklifts, hybrid vehicles, and electric vehicles. The power storage device 1 includes a module stacked body 2 and a housing 4 for accommodating the module stacked body 2. Hereinafter, a stacking direction of the module stacked body 2 in the housing 4 is denoted by a Z direction, a direction intersecting (for example, orthogonal to) the Z direction is denoted by an X direction, and a direction intersecting (for example, orthogonal to) the Z direction and the X direction is denoted by a Y direction. In one example, the X direction and the Y direction may be horizontal directions, and the Z direction may be an up-down direction (vertical direction).

The module stacked body 2 includes a power storage module 11, a positive-electrode current collector plate 31, a negative-electrode current collector plate 33, and a heat exchanger 30. In one example, each of the plurality of (two in the illustrated example) power storage modules 11 is interposed between the positive-electrode current collector plate 31 and the negative-electrode current collector plate 33. The power storage module 11 is arranged at a position interposed between the heat exchangers 30. The respective members (the power storage module 11, the positive-electrode current collector plate 31, the negative-electrode current collector plate 33, and the heat exchanger 30) constituting the module stacked body 2 may be stacked so as to be, for example, separated from each other.

Figure 2:
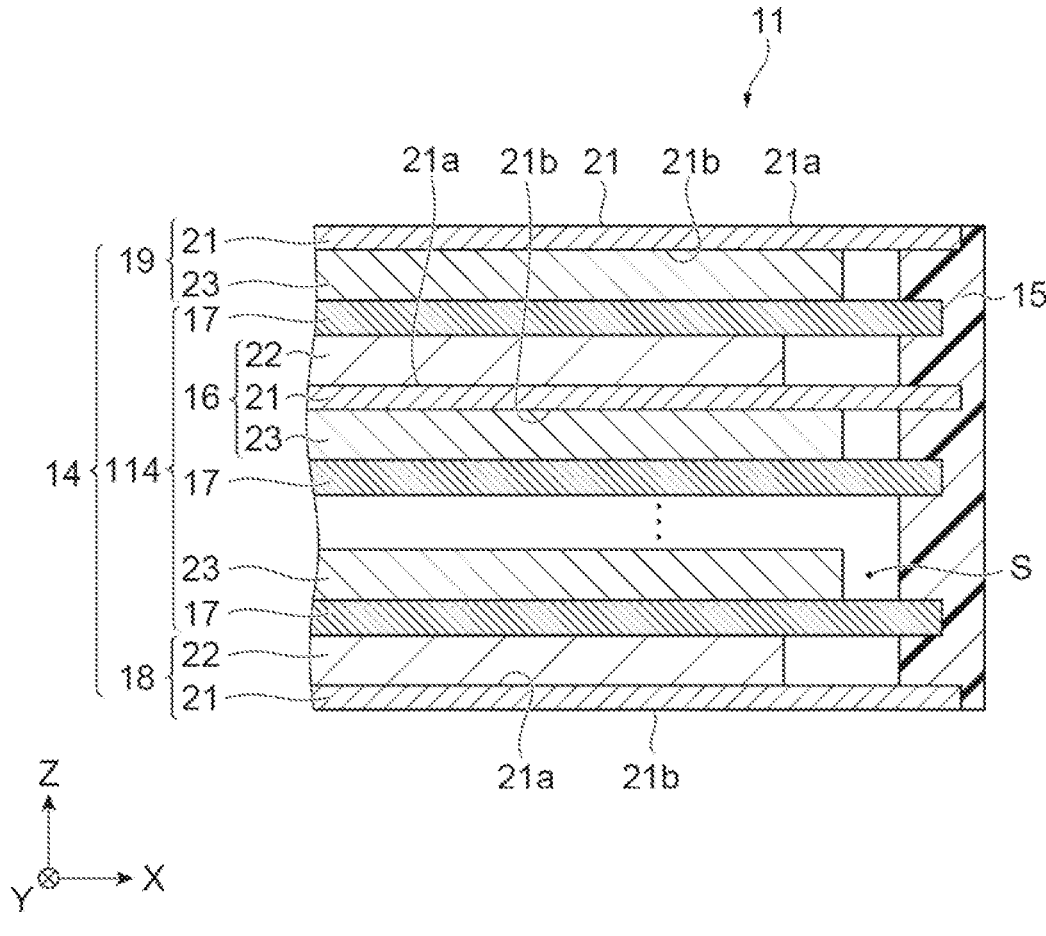
FIG. 2 is a schematic cross-sectional view of a power storage module included in the power storage device of FIG. 1.

The power storage module 11 has, for example, a substantially rectangular shape when viewed from the Z direction. As illustrated in FIG. 2, the power storage module includes a plurality of electric cells stacked in the Z direction. The power storage module 11 has a substantially rectangular parallelepiped shape. The power storage module 1 is, for example, a secondary battery such as a nickel hydrogen secondary battery or a lithium ion secondary battery. The power storage module 11 may be an electric double layer capacitor. The power storage module 11 may be an entire-solid-state battery. The power storage module 11 of the present embodiment is a bipolar type lithium ion secondary battery.

The power storage module 11 includes a stacked body 14 and a sealing member 15. The stacked body 14 has an electrode group 114 including a plurality of bipolar electrodes (electrodes) 16 and a plurality of separators 17, a positive-electrode termination electrode (termination electrode) 18, and a negative-electrode termination electrode (termination electrode) 19. The plurality of bipolar electrodes 16 and the plurality of separators 17 are alternately arranged along the Z direction. The stacked body 14 has an outer peripheral surface (side surface) connecting a pair of main surfaces intersecting in the Z direction and the main surfaces.

Each of the plurality of bipolar electrodes 16 includes an electrode body 21, a positive electrode layer 22, and a negative electrode layer 23. The electrode body 21 has a pair of main surfaces 21a and 21b that intersect in the Z direction. The positive electrode layer 22 is provided on the main surface (one surface) 21a of the electrode body 21, and the negative electrode layer 23 is provided on the main surface (the other surface) 21b of the electrode body 21. For this reason, the electrode body 21 is interposed between the positive electrode layer 22 and the negative electrode layer 23 along the Z direction.

The electrode body 21 is a sheet-shaped conductive member. The electrode body 21 has a substantially rectangular shape when viewed from the stacking direction. The electrode body 21 has a structure in which a plurality of metal foils including, for example, a metal foil provided with the positive electrode layer 22 constituting the main surface 21a of the electrode body 21 and a metal foil provided with the negative electrode layer 23 constituting the main surface 21b of the electrode body 21 are integrated. The plurality of metal foils are integrated by joining or abutting the surfaces of the plurality of metal foils on which the positive electrode layer 22 or the negative electrode layer 23 is not provided. Each metal foil is, for example, copper foil, aluminum foil, titanium foil, or nickel foil. Each metal foil may be, for example, a stainless steel foil (for example, SUS304, SUS316, SUS301, or the like specified in JIS G 4305:2015), a plated steel foil (for example, be a cold rolled steel foil (SPCC or the like) specified in JIS G 3141:2005), or a plated stainless steel foil, or may be an alloy foil containing two or more metals selected from a group consisting of copper, aluminum, titanium, and nickel. From the viewpoint of ensuring mechanical strength, the electrode body 21 may include aluminum foil. The surface of the metal foil may be coated with aluminum. The thickness of the electrode body 21 is, for example, 5 μm or more and 70 μm or less. It is noted that the electrode body 21 is not limited to the structure in which the plurality of metal foils are integrated, and may be configured with, for example, a single metal foil.

The positive electrode layer 22 is a layer-shaped member containing a positive electrode activation material, a conductive auxiliary agent, and a binder. The positive electrode layer 22 has a substantially rectangular shape. The positive electrode activation material of the present embodiment is, for example, a composite oxide, metallic lithium, sulfur, and the like. The composition of the composite oxide includes, for example, at least one of iron, manganese, titanium, nickel, cobalt, and aluminum, and lithium. Examples of the composite oxide include olivine-type lithium iron phosphate ($LiFePO_4$). The binder serves to tether the activation material or the conductive auxiliary agent to the surface of the electrode body 21 and maintain the conductive network in the electrode. Fluorine-containing resins such as polyvinylidene fluoride, polytetrafluoroethylene, and fluororubber, thermoplastic resins such as polypropylene and polyethylene, imide-based resins such as polyimide and polyamide-imide, alkoxysilyl group-containing resins, acrylic resins containing monomer units such as acrylic acid and methacrylic acid, styrene-butadiene rubber (SBR), carboxymethyl cellulose, alginates such as sodium alginate and ammonium alginate, water-soluble cellulose ester cross-linking agents, and starch-acrylic acid graft polymers are exemplified as the binders. These binders can be used alone or in multiples.

The conductive auxiliary agent is, for example, acetylene black, carbon black, graphite, or the like. The viscosity adjusting solvent is, for example, N-methyl-2-pyrrolidone (NMP) or the like.

The negative electrode layer 23 is a layer-shaped member containing a negative electrode activation material, a conductive auxiliary agent, and a binder. The negative electrode layer 23 has a substantially rectangular shape. The negative electrode activation material of the present embodiment is, for example, carbon such as graphite, artificial graphite, highly oriented graphite, mesocarbon microbeads, hard carbon, or soft carbon, a metal compound, an element that can be alloyed with lithium or a compound thereof, or boron added carbon, or the like. Examples of elements that can be alloyed with lithium include silicon and tin. As the conductive auxiliary agent and the binder, the same ones as those of the positive electrode layer 22 can be used.

The positive-electrode termination electrode 18 is provided at one end of the stacked body 14 in the Z direction. The positive-electrode termination electrode 18 is an electrode in which the positive electrode layer (activation material) 22 is provided only on one main surface 21a of the electrode body 21. That is, the negative electrode layer 23 is not arranged on the main surface 21b of the electrode body 21 arranged at one end of the stacked body 14 in the Z direction.

The negative-electrode termination electrode 19 is provided at the other end portion of the stacked body 14 in the Z direction. Similarly to the positive-electrode termination electrode 18, the negative-electrode termination electrode 19 is also an electrode in which the negative electrode layer (activation material) 23 is provided only on one main surface 21b of the electrode body 21. That is, the positive electrode layer 22 is not arranged on the main surface 21a of the electrode body 21 arranged at the other end of the stacked body 14 in the Z direction.

The separator 17 is a layer-shaped member that separates the adjacent bipolar electrodes 16 and 16 from each other, the bipolar electrode 16 and the positive-electrode termination electrode 18 from each other, and the bipolar electrode 16 and the negative-electrode termination electrode 19 from each other. The separator 17 has a substantially rectangular shape when viewed from the stacking direction. The separator 17 is a member that prevents a short circuit between the adjacent bipolar electrodes 16 and 16, a short circuit between the bipolar electrode 16 and the positive-electrode termination electrode 18, and a short circuit between the bipolar electrode 16 and the negative-electrode termination electrode 19. The thickness of the separator 17 is, for example, 1 μm or more and 20 μm or less.

The separator 17 is a porous film made of a polyolefin-based resin such as polyethylene (PE) and polypropylene (PP). The separator 17 may be a woven fabric or a non-woven fabric made of polypropylene, methyl cellulose or the like. The separator 17 may be reinforced with a vinylidene fluoride resin compound.

The sealing member 15 is a member that holds a plurality of bipolar electrodes 16, a plurality of separators 17, a positive-electrode termination electrode 18, and a negative-electrode termination electrode 19 included in the stacked body 14. The sealing member 15 has an insulating property. More specifically, the sealing member 15 retains the electrode bodies 21 constituting the bipolar electrode 16, the positive-electrode termination electrode 18 and the negative-electrode termination electrode 19 by retaining the distance between the electrode bodies 21 of the respective electrodes. The sealing member 15 exhibits a substantially rectangular frame shape so as to seal the outer peripheral surface (side surface) of the stacked body 14. The sealing member 15 can prevent a short circuit between the bipolar electrodes 16 inside the stacked body 14, a short circuit between the bipolar electrode 16 and the positive-electrode termination electrode 18, and a short circuit between the bipolar electrode 16 and the negative-electrode termination electrode 19.

Examples of the material forming the sealing member 15 include a resin member exhibiting heat resistance and the like. Examples of the resin member exhibiting heat resistance include polyimide, polypropylene (PP), polyphenylene sulfide (PPS), modified polyphenylene ether (modified PPE), PA66, and the like. The thickness of the sealing member 15 is, for example, 10 μm or more and 20 μm or less.

An electrolytic solution is accommodated in the space S sealed by the sealing member 15. An example of the electrolytic solution is a carbonate-based or polycarbonate-based electrolytic solution. A supporting salt contained in the electrolytic solution is, for example, a lithium salt. The lithium salt is, for example, $LiBF_4$, $LiPF_6$, $LiN(SO_2CF_3)_2$, $LiN(SO_2C_2F_5)_2$, or a mixture thereof.

FIG. 1 is referred to again. The positive-electrode current collector plate 31 is arranged on one surface of the power storage module 11. The negative-electrode current collector plate 33 is arranged on the other surface of the power storage module 11. The positive-electrode current collector plate 31 faces the positive-electrode termination electrode 18 constituting the power storage module 11. The positive-electrode current collector plate 31 is electrically connected to the positive-electrode termination electrode 18. The negative-electrode current collector plate 33 faces the negative-electrode termination electrode 19 constituting the power storage module 11. The negative-electrode current collector plate 33 is electrically connected to the negative-electrode termination electrode 19. The positive-electrode current collector plate 31 and the negative-electrode current collector plate 33 function as positive-electrode terminals and negative-electrode terminals of the power storage module 11. In the following description, in some cases, the current collector plate 35 may be used as a generic term for the positive-electrode current collector plate 31 and the negative-electrode current collector plate 33.

The heat exchanger 30 is arranged between the current collector plates 35 adjacent to each other in the Z direction. Further, when the Z direction is denoted by the up-down direction, the heat exchanger 30 is arranged at the upper portion of the current collector plate 35 arranged at the upper end and the lower portion of the current collector plate 35 arranged at the lower end. In the illustrated example, the heat exchangers 30 are arranged between the positive-electrode current collector plates 31 adjacent to each other in the Z direction, at the upper portion of the negative-electrode current collector plate 33 arranged at the upper end in the Z direction, and at the lower portion of the negative-electrode current collector plate 33 arranged at the lower end in the Z direction, respectively.

The heat exchanger 30 exchanges heat with the adjacent power storage modules 11 via the positive-electrode current collector plate 31 or the negative-electrode current collector plate 33. The heat exchanger 30 is, for example, a heat radiation plate that radiates the heat generated in the power storage module 11 to the outside of the power storage device 1. The heat exchanger 30 has a substantially rectangular shape when viewed from the Z direction. For example, a flow path (not illustrated) through which a cooling fluid such as water, oil, or air passes is formed inside the heat exchanger 30.

In the present embodiment, in the power storage modules 11 adjacent to each other, the termination electrodes facing each other (positive-electrode termination electrode 18 and negative-electrode termination electrode 19) are arranged so as to have the same electrodes. For this reason, the pair of current collector plates 35 arranged between the power storage modules 11 adjacent to each other also have the same electrodes. In the illustrated example, the positive-electrode termination electrode 18 of one power storage module 11 and the positive-electrode termination electrode 18 of the other power storage module 11 face each other. For this reason, the pair of positive-electrode current collector plates 31 are arranged between the pair of power storage modules 11. The heat exchanger 30 is arranged between the positive-electrode current collector plate 31 abutting on one power storage module 11 and the positive-electrode current collector plate 31 abutting on the other power storage module 11 between the pair of power storage modules 11.

The positive-electrode current collector plate 31 and the negative-electrode current collector plate 33 are, for example, conductive plates such as a copper plate, an aluminum plate, a titanium plate, or a nickel plate. The positive-electrode current collector plate 31 overlaps the bipolar electrode 16 and the separator 17 when viewed from the Z direction. The positive-electrode current collector plate 31 has a substantially rectangular shape. The thickness of the positive-electrode current collector plate 31 is, for example, 1 mm or more and 5 mm or less. Further, the negative-electrode current collector plate 33 has, for example, a substantially rectangular shape when viewed from the Z direction. The thickness of the negative-electrode current collector plate 33 is, for example, 1 mm or more and 5 mm or less.

In the module stacked body 2 of the example, at least one pair of members (power storage modules 11, positive-electrode current collector plates 31, negative-electrode current collector plates 33, and heat exchangers 30) adjacent to each other are stacked to be able to be separated from each other between the power storage modules 11. In the present embodiment, the power storage module 11 and the current collector plate 35 adjacent to the power storage module 11 are not adhered (fixed) to each other by an adhesive or the like. Further, no adhesive (fixing) means such as an adhesive is provided between the negative-electrode current collector plate 33 and the heat exchanger 30.

The housing 4 of the example has a case (housing body) 3 and a cover (lid) 5. The case 3 and the cover 5 may be made of, for example, a metal material such as stainless steel or a resin material. It is noted that, in one example, the case 3 and the cover 5 may have a metal layer on the surface or inside in order to reduce transmittance of gas or liquid. The case 3 has a bottomed cylindrical shape having a substantially rectangular shape when viewed from the Z direction and has an opening 3a at one end (upper end in the illustrated example) in the Z direction. The module stacked body 2 can be accommodated in a space SP formed inside the case 3. The case 3 of the illustrated example has a side wall 3b, a bottom wall 3c, and a brim 3d. The side wall 3b of one example has a rectangular shape when viewed from the Z direction so that a rectangular parallelepiped space SP is formed inside. That is, the side wall 3b extends along the stacking direction (Z direction) in the module stacked body 2. In the illustrated example, the length of the side wall 3b in the Z direction is smaller than that of the module stacked body 2, but may be larger.

It is noted that a pressure adjusting portion 3e may be formed on the side wall 3b of the illustrated example. In one example, the pressure adjusting portion 3e is arranged above the center of the side wall 3b in the up-down direction (Z direction). The pressure adjusting portion 3e is located, for example, above the upper end of an intermediate member 45 described later and below the brim 3d. When the gas is generated inside the housing 4 and the internal pressure of the housing 4 exceeds a predetermined magnitude, the pressure adjusting portion 3e can discharge the gas inside the housing 4 to the outside. The pressure adjusting portion 3e of one example is a valve that opens when the pressure in the housing 4 becomes equal to or higher than the atmospheric pressure.

The bottom wall 3c closes the other end portion of the side wall 3b in the Z direction. In the illustrated example, the bottom wall 3c is formed at the lower end of the side wall 3b. The bottom wall 3c is connected to the lower end of the side wall 3b. The bottom wall 3c has a plate shape extending in the XY plane. The brim 3d is formed at the other end portion of the side wall 3b in the Z direction. The brim 3d has a rectangular shape larger than the outer shape of the side wall 3b when viewed from the Z direction. The brim 3d projects from the upper end of the side wall 3b toward the outside of the side wall 3b along the XY plane with the upper end of the side wall 3b being set as a base end.

The cover 5 is a member that closes the opening 3a of the case 3. Similar to the case 3, the cover 5 of one example has a substantially rectangular shape when viewed from the Z direction. The cover 5 has an outer shape substantially the same size as the brim 3d. The cover 5 includes a peripheral edge portion 5a facing the brim 3d, a central portion 5b having a rectangular plate shape constituting the center of the cover 5, and a connection portion (easily-deformable portion) 5c connecting the peripheral edge portion 5a and the central portion 5b. The peripheral edge portion 5a has a rectangular frame shape having the same outer shape as the brim 3d when viewed from the Z direction. The inner edge of the peripheral edge portion 5a is located inside the inner circumference of the side wall 3b when viewed from the Z direction. In one example, the case 3 and the cover 5 are connected by welding the peripheral edge portion 5a and the brim 3d. Accordingly, a sealed space (first sealed space) SS is formed inside the housing 4.

In one example, the air pressure (internal pressure) inside the sealed space SS is lower than the air pressure (external pressure) outside the sealed space SS. Since the power storage device in the present embodiment is assumed to be used under the atmospheric pressure, the air pressure inside the sealed space SS is less than atmospheric pressure. For example, the sealed space SS may be evacuated. In one example, the brim 3d of the case 3 and the peripheral edge portion 5a of the cover 5 may be welded inside an evacuated chamber. It is noted that, in the illustrated example, an adsorbent 7 adsorbing gas and water is provided in the sealed space SS. For example, when the gas and the water are discharged from the power storage module 11 into the sealed space SS, the gas and the water are adsorbed by the adsorbent 7. The adsorbent 7 may be made of, for example, silica gel, activated alumina, activated carbon, or the like.

The central portion 5b has substantially the same size as the module stacked body 2 when viewed from the Z direction. The central portion 5b of one example is located above the peripheral edge portion 5a in the Z direction. The connection portion 5c connects the outer edge of the central portion 5b and the inner edge of the peripheral edge portion 5a. In the illustrated example, the connection portion 5c is inclined upward from the inner edge of the peripheral edge portion 5a to the outer edge of the central portion 5b. It is noted that, the central portion 5b may be located below the peripheral edge portion 5a in the Z direction. In that case, the connection portion 5c is inclined downward from the inner edge of the peripheral edge portion 5a to the outer edge of the central portion 5b. In one example, the elasticity of the connection portion 5c may be higher than that of the other portions of the housing 4. In other words, the stiffness of the connection portion 5c may be smaller than that of the other portions of the housing 4. That is, the connection portion 5c may be more easily deformed by the influence of an external force than the other portions of the housing 4. For example, the plate thickness of the connection portion 5c may be smaller than the plate thickness of the central portion 5b and the plate thickness of the peripheral edge portion 5a. It is noted that the plate thickness of the connection portion 5c is a thickness of the connection portion 5c in a direction orthogonal to the plane intersecting the Z direction (that is, in a direction in which the Z direction is inclined by the inclination of the connection portion 5c). In addition, the plate thickness of the central portion 5b and plate thickness of the peripheral edge portion 5a are the thickness of the central portion 5b and the thickness the peripheral edge portion 5a in the direction (that is, the Z direction) orthogonal to the plane intersecting the Z direction. The connection portion 5c can be deformed so as to bend due to the air pressure difference between the inside and outside of the sealed space SS. In one example, since the internal pressure of the sealed space SS is lower than the external air pressure, the connection portion 5c can bend so that the central portion 5b moves downward in the Z direction.

The module stacked body 2 of the example is interposed between a pair of the central portions 3f and 5b via an intermediate member 40. An intermediate member 41 is arranged between the bottom wall 3c of the case 3 and the module stacked body 2. An intermediate member 43 is arranged between the central portion 5b formed on the cover 5 and the module stacked body 2. Further, as illustrated in the drawing, the intermediate member 45 may be arranged between the side wall 3b and the module stacked body 2 so as to be in contact with both the module stacked body 2 and the inner surface (inner wall surface) of the side wall 3b. For example, the intermediate member 45 extends so as to be in contact with the two power storage modules 11 and so as to include the position of one power storage module 11 and the position of the other power storage module 11 in the Z direction.

The intermediate member 40 includes a package 40a that forms a sealed space (second sealed space) SS2 inside and a fluid 40b that is sealed in the sealed space SS2 of the package 40a. The package 40a is made of a flexible material that can be deformed according to the constraint load. The material of the package 40a is, for example, a resin, for example, and as an example, material of the package 40a is a polyolefin-based resin having an insulating property such as polyethylene (PE) and polypropylene (PP). The fluid 40b may be a gas, a liquid, a gel, or a mixture thereof. Further, the fluid 40b may be a mixture of a gas, a liquid, a gel, or a mixture thereof with a powder (for example, a fire extinguishing agent). The material of the fluid 40b can be, for example, a liquid that does not freeze or vaporize in the environment of use, such as oil, or LLC (antifreeze solution) used in a coolant. As described above, the intermediate member 40 is configured as a gas pack, a liquid pack, or a gel pack.

In one example, the fluid 40b contains a gas such as air. The air pressure in the sealed space SS is lower than the air pressure in the sealed space SS2. For this reason, due to the air pressure difference between the sealed space SS and the sealed space SS2, the package 40a is expanded more than in the natural state (no load state).

Figure 3:
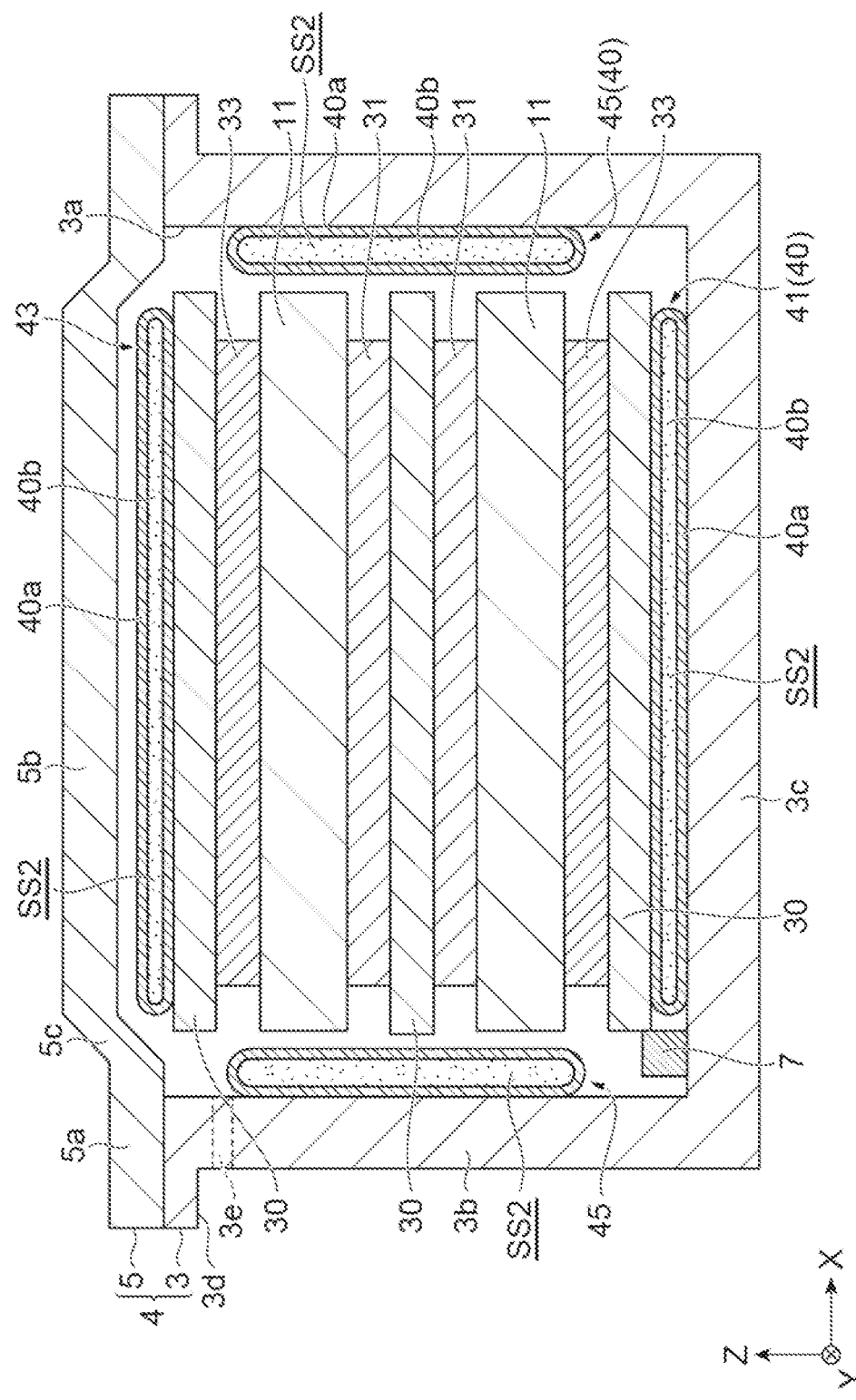
FIG. 3 is a schematic cross-sectional view illustrating a state in which the inside of a housing is at an atmospheric pressure in the power storage device of FIG. 1.

FIG. 3 illustrates a power storage device 1 in a natural state, that is, in a state where the internal pressure of the sealed space SS is the same as the atmospheric pressure. As illustrated in FIG. 3, in the natural state, no external force is applied to the connection portion 5c due to no influence of the air pressure difference. The central portion 5b of an example may be located on the upper side in the (up-down direction Z direction) as compared with the state of FIG. 1. Further, in the natural state, the package 40a may not be expanded due to no influence of the air pressure difference. The package 40a of one example may be withered as compared with the state of FIG. 1.

As illustrated in FIG. 1, the bottom wall 3c formed in the case 3 and the central portion 5b formed in the cover 5 face each other with the space SP of the housing 4 interposed therebetween. As described above, since the inside of the sealed space SS is adjusted to a low pressure, the housing 4 can be deformed so that the distance between the bottom wall 3c and the central portion 5b becomes small. Accordingly, the module stacked body 2 is interposed between the bottom wall 3c and the central portion 5b, so that the module stacked body 2 is constrained inside the sealed space SS of the housing 4. In a state where the module stacked body 2 is interposed between the bottom wall 3c and the central portion 5b, stress is applied to, for example, the connection portion 5c of the cover 5.

In the power storage device 1 described above, at least a portion of the bottom wall 3c and the cover 5 is deformed so as to come close to each other due to the air pressure difference between the inside and outside of the sealed space SS, and the module stacked body 2 is constrained by the deformed housing 4. That is, in a state where the module stacked body 2 is arranged in the sealed space SS, only by allowing the air pressure difference inside and outside the sealed space SS to occur, the module stacked body 2 is constrained by the housing 4.

Further, the intermediate member 40 has a deformable package 40a having the sealed space SS2 inside. The sealed space SS2 contains at least a gas. The air pressure in the sealed space SS may be lower than the air pressure in the sealed space SS2. In this configuration, the intermediate member 40 arranged between the inner wall surface of the housing 4 and the module stacked body 2 expands due to the air pressure difference between the sealed space SS and the sealed space SS2. Accordingly, the intermediate member 40 can function as a damper. In a case where a non-expandable member is used as the intermediate member, when the intermediate member is to be arranged between the inner wall surface of the housing 4 and the module stacked body 2, for example, the module stacked body 2 and the intermediate member interfere with each other, so that it may be difficult to arrange the intermediate member at an appropriate position. However, when the intermediate member 40 that expands by using the air pressure difference is arranged, the intermediate member 40 can be easily arranged as long as there is no air pressure difference.

Further, the peripheral edge portion 5*a* of the cover 5 may have a lower stiffness than the central portion 5*b*. In this configuration, the module stacked body 2 can be appropriately interposed between the plate-shaped central portion 5*b* and the plate-shaped bottom wall 3*c* while the deformability of the housing 4 is ensured by the peripheral edge portion 5*a* having low stiffness.

Further, the adsorbent 7 adsorbing gas is provided inside the sealed space SS. In this configuration, the gas inside the sealed space SS is absorbed by the adsorbent 7, so that a fluctuation of the air pressure in the sealed space SS can be suppressed.

Further, the case 3 of the housing 4 is provided with the pressure adjusting portion 3*e* that opens when the pressure in the housing 4 (sealed space SS) becomes equal to or higher than the atmospheric pressure. In the power storage device 1 of an example, since the normal pressure of the sealed space SS is lower than the atmospheric pressure, an inexpensive valve that opens at the atmospheric pressure or higher can be used.

Although the example of the present disclosure has been described in detail above, the present disclosure is not limited to the above-described embodiment.

For example, although the module stacked body in which the two power storage modules are stacked is illustrated, the module stacked body may include three or more power storage modules, or may be configured with only one power storage module.

Further, although an example in which the electrolytic solution as an electrolyte is accommodated in the space S sealed by the sealing member 15 has been described, the electrolyte may be solid or a gel state. In this case, the sealing member may seal between the electrodes so that the electrolyte does not leak to the outside of the power storage module. When the electrolyte is a gel state, the electrolyte may be immersed with a separator formed of a non-woven fabric or the like to form a semi-solid state, or may be a solid electrolyte. Further, when the electrolyte is a solid electrolyte instead of the electrolytic solution, the separator may be configured with the solid electrolyte. When the separator is configured with a solid electrolyte, the separator may have a substantially rectangular plate shape.

Further, although an example in which the module stacked body is interposed between a pair of pressing portions via the intermediate member is illustrated, the intermediate member is not always necessary. When the intermediate member is not arranged, the module stacked body may be interposed between a pair of the upper and lower pressing portions constituting the housing.

Figure 4:
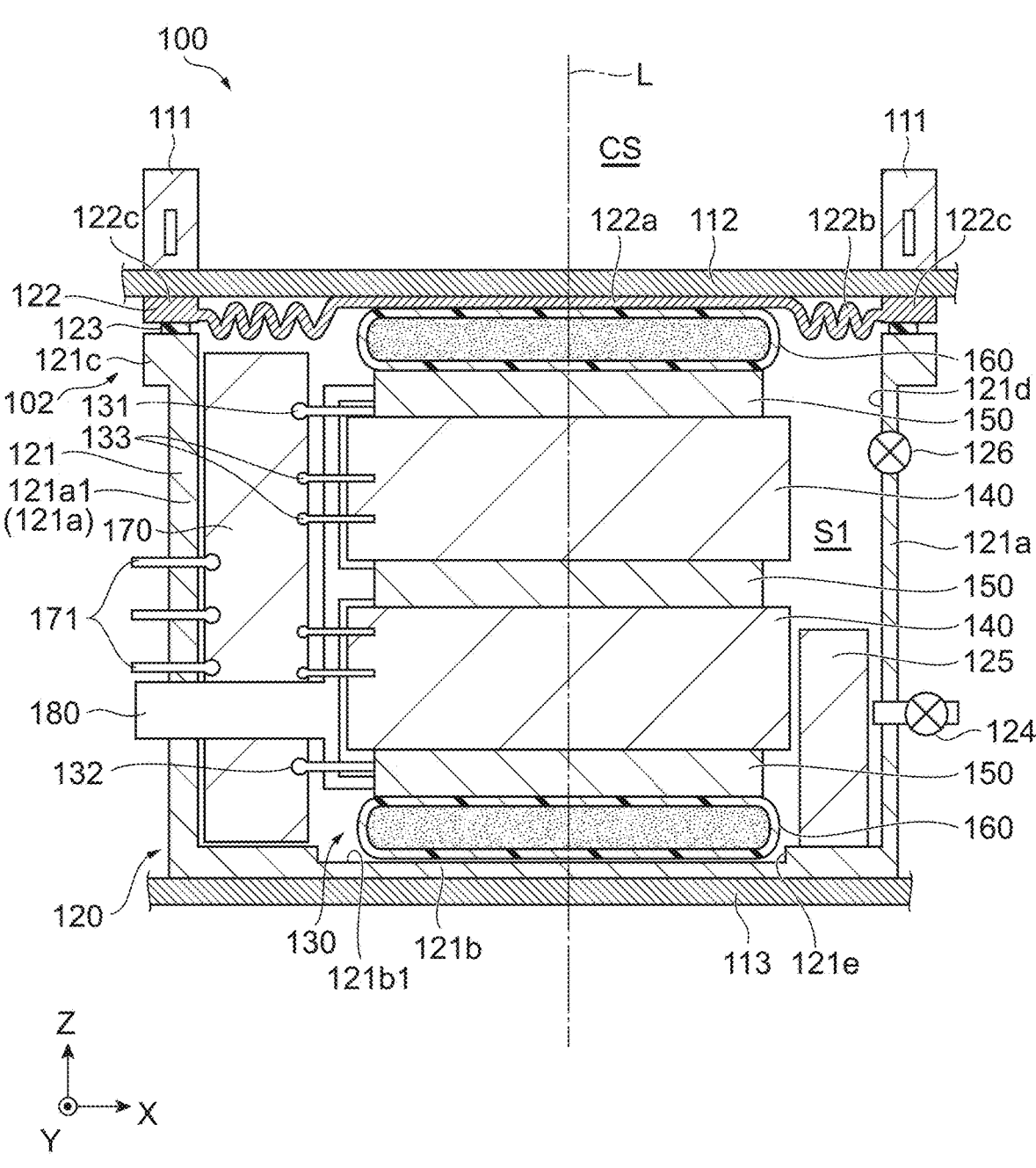
FIG. 4 is a schematic cross-sectional view illustrating, a power storage device according to another example.

FIG. 4 is a schematic cross-sectional view illustrating an example of the power storage device. It is noted that, in some cases, with respect to the same or equivalent elements as those in the above embodiment, duplicate description may be omitted. The power storage device 102 illustrated in FIG. 4 is attached to the lower portion of the vehicle 100. The vehicle 100 may be, for example, a forklift, a hybrid vehicle, an electric vehicle, or the like. As illustrated in FIG. 4, the vehicle 100 includes a pair of side members (rib members) 111, a floor panel (panel member) 112, and a lower case (another panel member) 113.

The pair of side members 111 is a portion of the chassis forming the skeleton of the vehicle 100. The pair of side members 111 are provided below a vehicle interior CS of the vehicle 100. The pair of side members 111 are provided on both sides of the vehicle 100 in the width direction (right-left direction, X direction) of the vehicle 100. The pair of side members 111 extend along the front-rear direction (Y direction) of the vehicle 100.

The floor panel 112 is a portion of the body of the vehicle 100. The floor panel 112 is provided below the vehicle interior CS of the vehicle 100. The floor panel 112 is provided below the pair of side members 111. The floor panel 112 is a plate-shaped member that extends in the horizontal direction (XY plane). The floor panel 112 includes a portion extending between the pair of right and left side members 111. The lower case 113 is a panel member different from the floor panel 112, and is a portion of the body of the vehicle 100. The lower case 113 is provided below the floor panel 112. The lower case 113 is separated from the floor panel 112 in the height direction (Z direction) of the vehicle 100. The lower case 113 is a plate-shaped member that extends in the horizontal direction.

The power storage device 102 includes a housing 120. A module stacked body 130, an intermediate member 160, a peripheral device 170 (electronic device), and a supply pipe 180 are arranged in an internal space S1 of the housing 120. The module stacked body 130 is arranged as a single unit in the X direction and the Y direction. That is, only one module stacked body 130 is arranged inside the housing 120. When viewed from the Z direction, the module stacked body 130 is arranged inside the housing 120 so as to overlap the center line L of the vehicle 100 in the X-axis direction. Specifically, each of the center line of the pair of side members 111 in the X direction and the center line of the internal space S1 in the X direction coincides with the center line L of the vehicle 100. When viewed from the Z direction, the module stacked body 130 is arranged in the center of the internal space S1. When viewed from the Z direction, the center line of the module stacked body 130 in the X direction and the center line of the module stacked body 130 in the Y direction coincide with the center line of the internal space S1 in the X direction and the center line of the internal space S1 in the Y direction, respectively.

The module stacked body 130 is configured to include a plurality of power storage modules 140 stacked in the Z direction and a plurality of heat exchangers 150. Herein, the module stacked body 130 has the two power storage modules 140 and the three heat exchangers 150. The heat exchangers 150 and the power storage modules 140 are alternately arranged in the Z direction so that the power storage modules 140 are interposed between the heat exchangers 150. The number of arrangements of the power storage modules 140 and the heat exchangers 150 is not limited to the example of FIG. 4, and a larger number of power storage modules 140 and the heat exchangers 150 may be arranged alternately. Alternatively, the module stacked body 130 may be configured with one power storage module 140 and the heat exchanger 150 arranged so as to interpose the power storage module 140 therebetween.

The area of the power storage module 140 when viewed from the Z direction is larger than the area of the power storage module 140 when viewed from the X direction or the Y direction. The area of the power storage module 140 when viewed from the Z direction is, for example, 1 m² or more. When viewed from the Z direction, the area of the power storage module 140 is larger than, for example, ½ of the area of the internal space S1. When viewed from the Z direction, the width of the power storage module 140 in the X direction is larger than, for example, ½ of the distance between the pair of side members 111 or ½ of the width of the internal space S1 in the X axis direction. When viewed from the Z direction, the width of the power storage module 140 in the Y direction is larger than, for example, ½ of the distance between the pair of side members 111 or ½ of the width of the internal space S1 in the Y direction.

The heat exchanger 150 is a portion that cools the power storage module 140. The heat exchanger 150 is, for example, a plate-shaped member having a flow path through which the cooling fluid passes. When viewed from the Z direction, the outer edge of the heat exchanger 150 is located inside the outer edge of the power storage module 140. The flow path is configured with through-holes penetrating the plate-shaped member in the in-plane direction. A supply pipe 180 through a case 121 is connected to the flow path, and the cooling fluid is circulated to and from the outside of the case 121. For example, air, water, oil, or the like is used as the cooling fluid. The cooling fluid may have an electrical insulating property. When the cooling fluid is conductive, it is preferable that the heat exchanger 150 is insulated with respect to the cooling fluid.

In this embodiment, the heat exchanger 150 also functions as a current collector plate. The heat exchanger 150 arranged at the upper end of the module stacked body 130 in the Z direction is electrically connected to the positive-electrode termination electrode of the power storage module 140 arranged on the upper side in the Z direction. The heat exchanger 150 arranged at the lower end in the Z direction of the module stacked body 130 is electrically connected to the negative-electrode termination electrode of the power storage module 140 arranged on the lower side in the Z direction. The heat exchanger 150 arranged between the two power storage modules 140 is electrically connected to the negative-electrode termination electrode of the power storage module 140 arranged on the upper side in the Z direction and the positive-electrode termination electrode of the power storage module 140 arranged on the lower side in the Z direction. Therefore, the heat exchangers 150 arranged at the upper end of the module stacked body 130 in the Z direction function as positive-electrode terminals of the plurality of power storage modules 140. Further, the heat exchangers 150 arranged at the lower end in the Z direction of the module stacked body 130 function as negative-electrode terminals of the plurality of power storage modules 140.

The intermediate member 160 is the same as the intermediate member 40. The intermediate member 160 is arranged inside the housing 120 together with the module stacked body 130. The intermediate member 160 is arranged between the inner surface of the housing 120 and the module stacked body 130. Specifically, the intermediate member 160 is arranged at both ends of the module stacked body 130 in the stacking direction (Z direction). The intermediate member 160 is located between a bottom wall 121b of the case 121 to be described later and the module stacked body 130, and between a flat plate portion 122a of a sheet-shaped member 122 to be described later and the module stacked body 130, respectively. When viewed from the Z direction, the outer edge of the intermediate member 160 is located outside the outer edge of the heat exchanger 150.

The peripheral device 170 (electronic device) includes a control device that performs charge/discharge control, abnormality detection control, and the like of the power storage device 102. The control device may include various power supplies, control circuits, and the like, and may include, for example, a central processing unit (CPU), a random access memory (RAM), a read only memory (ROM), an input/output interface, and the like. Further, the peripheral device 170 may include a pump or the like for circulating the cooling fluid in the supply pipe 180. The peripheral device 170 is connected to terminals 131 and 132 connected to the module stacked body 130 and a plurality of terminals 133. The terminal 131 is electrically connected to the heat exchanger 150 arranged at the upper end of the module stacked body 130 in the Z direction. The terminal 132 is electrically connected to the heat exchanger 150 arranged at the lower end of the module stacked body 130 in the Z direction. The terminals 131 and 132 are power terminals for extracting electric power from the module stacked body 130. The plurality of terminals 133 may be electrically connected to each of the plurality of electrodes included in each power storage module 140. The plurality of terminals 133 are, for example, voltage measuring terminals for acquiring the respective voltages of the plurality of electrodes. The peripheral device 170 is electrically connected to the outside of the housing 120 by a plurality of terminals 171. The electric power of the module stacked body 130 extracted from the terminals 131 and 132 can be extracted from the plurality of terminals 171 to the outside of the housing 120. A voltage acquired from the plurality of terminals 133 or information based on the voltage is extracted from the plurality of terminals 171 to the outside of the housing 120. The number of the plurality of terminals 171 is smaller than the total number of the terminals 131 and 132 and the plurality of terminals 133. In the present embodiment, the dimension of the peripheral device 170 in the stacking direction is smaller than the sum of the dimension of the module stacked body 130 in the stacking direction and the dimension of the intermediate member 160 in the stacking direction.

The housing 120 may be provided with a decompression pump 124. The decompression pump 124 may be a valve provided with a pump for decompressing the internal space S1. The decompression pump 124 is electrically connected to the peripheral device 170. That is, the operation of the decompression pump 124 is controlled by the peripheral device 170. In the power storage device 102 of an example, the housing may be sealed in a state where the internal space S1 is decompressed. The decompression pump 124 maintains the internal pressure of the housing 120 in a state of being decompressed with respect to the atmospheric pressure by suctioning the gas of the internal space S1 of the housing 120. For example, the peripheral device 170 may include a barometer that measures the air pressure inside the housing 120. When the peripheral device 170 detects an increase in air pressure inside the housing 120 (when the internal pressure exceeds a predetermined threshold value), the peripheral device 170 may operate the decompression pump 124 to decompress the inside of the housing 120.

The internal space S1 of the housing 120 is provided with an adsorption member 125 that adsorbs gas and moisture. The adsorption member 125 is, for example, the same as the adsorbent 7.

The housing 120 may be provided with a pressure release valve 126. The pressure release valve 126 is a valve that operates when the internal pressure of the housing 120 increases by the high temperature gas generated when the power storage module 140 deteriorates or is abnormal. Due to the operation of the pressure release valve 126, by discharging the gas of the internal space S1 of the housing 120 to the outside of the housing 120, the pressure is relaxed so that the internal pressure of the housing 120 does not exceed a predetermined value. The type of the pressure release valve 126 is not particularly limited, but may be, for example, a broken type valve that is broken when the pressure exceeds a predetermined threshold value, and may be a fusible-plug type valve that melts when the temperature exceeds a predetermined threshold value. The pressure release valve 126 of one example opens when the pressure of the internal space S1 becomes equal to or higher than the atmospheric pressure.

The power storage device 102 will be described in more detail. As illustrated in FIG. 4, the housing 120 has the case (housing body) 121 and the sheet-shaped member (lid) 122. The case 121 is made of a metal such as stainless steel and has a rectangular parallelepiped shape. The case 121 has a bottomed box shape with an opening portion 121d provided on one side. A flange 121c is provided around the opening portion 121d of the case 121. The case 121 has a bottom wall 121b and side walls 121a erected on edges of the four sides of the bottom wall 121b, respectively.

The side wall 121a includes a first side wall 121a1 adjacent to the peripheral device 170. It is noted that "adjacent" includes not only the case where the peripheral device 170 and the first side wall 121a1 are in contact with each other, but also the case where a gap is formed between the peripheral device 170 and the first side wall 121a1. The plate thickness of the first side wall 121a1 is larger than the plate thickness of the sheet-shaped member 122 and the plate thickness of the bottom wall 121b. Further, a step portion (step) 121e is formed on the inner surface of the bottom wall 121b. In the bottom wall 121b, the step portion 121e surrounds the position where the module stacked body 130 is provided. The step portion 121e has a stepped surface facing the module stacked body 130 (intermediate member 160) and surrounding the module stacked body 130. The position where the peripheral device 170 is provided is outside the range surrounded by the step portion 121e. Due to the step portion 121e, the position where the module stacked body 130 is provided is lower than the position where the peripheral device 170 is provided. In the bottom wall 121b, the plate thickness in the range surrounded by the step portion 121e is smaller than the plate thickness in the other portion, that is, outside the range surrounded by the step portion 121e.

The case 121 is not arranged in the space between the pair of side members 111, but is arranged below the flat surface on the floor panel 112 opposite to the vehicle interior CS. The case 121 is arranged between the floor panel 112 and the lowercase 113. When viewed from the Z direction, the width of the case 121 in the X direction is larger than the distance between the pair of side members 111 (the distance between the inner surfaces of the pair of side members 111 facing each other). The flanges 121c on both sides of the case 121 in the X direction are arranged below the pair of side members 111 via the sheet-shaped member 122 and the floor panel 112.

The case 121 is fixed with respect to the pair of side members 111 in a state of being suspended from the pair of side members 111 below the floor panel 112 and the pair of side members 111. Specifically, the case 121 is fixed with respect to the pair of side members 111 from the lower side of the pair of side members 111. The case 121 is hung down from the pair of side members 111. The flange 121c of the case 121 is fastened to the pair of side members 111 via the sheet-shaped member 122 and the floor panel 112 by, for example, a plurality of bolts (not illustrated) and a plurality of nuts (not illustrated). Accordingly, the power storage device 102 is attached to the vehicle 100 below the pair of side members 111 and the floor panel 112. It is noted that the plurality of bolts may be inserted into the flange 121c and the side member 111 from the side opposite to the side member 111 with respect to the flange 121c, or may be inserted into the member 111 and the flange 121c from the side opposite to the flange 121c with respect to the side member 111.

The sheet-shaped member 122 closes the opening portion 121d of the case 121. The sheet-shaped member 122 includes a flat plate portion 122a, a spring portion 122b, and an outer edge portion 122c. The flat plate portion 122a, the spring portion 122b, and the outer edge portion 122c are integrally formed of the same material. The flat plate portion 122a is a flat plate-shaped member facing the module stacked body 130. The flat plate portion 122a has substantially the same size as the module stacked body 130 when viewed from the Z direction. The flat plate portion 122a extends in the horizontal direction. The flat plate portion 122a has a rectangular shape when viewed from the Z direction. The spring portion 122b is connected to the outer edge of the flat plate portion 122a. The spring portion 122b has a rectangular annular shape when viewed from the Z direction. The outer edge portion 122c is connected to the outer edge of the spring portion 122b. The outer edge portion 122c has a rectangular annular shape when viewed from the Z direction. The spring portion 122b is formed by bending a portion of the sheet-shaped member 122 between the flat plate portion 122a and the outer edge portion 122c a plurality of times. Accordingly, the sheet-shaped member 122 has a spring property in the in-plane direction. The elastic coefficient of the spring portion 122b is smaller than the elastic coefficient of the flat plate portion 122a and the elastic coefficient of the outer edge portion 122c. The stiffness of the spring portion 122b is smaller than the stiffness of the flat plate portion 122a and the stiffness of the outer edge portion 122c.

The sheet-shaped member 122 is arranged between the floor panel 112 and the case 121. When viewed from the Z direction, the outer edge of the flat plate portion 122a is located outside the outer edge of the intermediate member 160. When viewed from the Z direction, the spring portion 122b surrounds the intermediate member 160. The outer edge portion 122c is arranged between the floor panel 112 and the flange 121c of the case 121. The outer edge portion 122c is airtightly fixed with respect to the flange 121c by a sealing member 123. Accordingly, the housing 120 is formed with the internal space S1 that airtightly maintains the inside.

The internal space S1 is airtightly sealed in a decompressed state during the manufacturing, and as described above, the decompressed state with respect to the atmospheric pressure is maintained by the suction of the decompression pump 124. The internal pressure of the internal space S1 is smaller than the atmospheric pressure of the outside of the case 121. For this reason, a force acting from the outside to the inside of the case 121 acts on the case 121. Accordingly, the module stacked body 130 interposed between the sheet-shaped member 122 and the bottom wall 121b of the case 121 is constrained in the Z direction. Therefore, the module stacked body 130 and the floor panel 112 can be easily constrained without requiring a strong fastening force. Further, since the constraint load due to the fastening of the sheet-shaped member 122 and the case 121 can be reduced, the stress applied to the floor panel 112 can be reduced.

The sheet-shaped member 122 has a spring property in the in-plane direction due to the spring portion 122b. In this case, since the sheet-shaped member 122 is easily deformed, followability of the sheet-shaped member 122 to the intermediate member 160 and the buffer absorption by the sheet-shaped member 122 can be improved. Further, when the internal space S1 is decompressed, the deformation of the case 121 can be suppressed by allowing the sheet-shaped member 122 to follow the intermediate member 160. Accordingly, the case 121 can be made thinner. Further, the influence of vibration on the module stacked body 130 or swelling on the vehicle 100 side can be absorbed by the sheet-shaped member 122.

The peripheral device 170 electrically connected to the module stacked body 130 is arranged inside the internal space S1. By inserting the peripheral device 170 necessary for the operation of the module stacked body 130 into the decompressed housing 120, the number of wirings going out from the inside of the housing 120 is reduced. For this reason, the airtightness inside the housing 120 is likely to be maintained.

The dimension of the peripheral device 170 in the stacking direction is smaller than a sum of the dimension of the module stacked body 130 in the stacking direction and the dimension of the intermediate member 160 in the stacking direction. That is, the dimension of the peripheral device 170 in the stacking direction is smaller than the dimension in the stacking direction between the portions of the bottom wall 121b and the sheet-shaped member 122 constraining the module stacked body 130. In this configuration, when the constraint load is applied to the module stacked body 130, the constraint load is suppressed from being applied to the peripheral device 170. Accordingly, damage to the peripheral device 170 is suppressed. It is noted that, when the intermediate member 160 is not arranged, it is preferable that the dimension of the peripheral device 170 in the stacking direction is smaller than the dimension of the module stacked body 130 in the stacking direction.

The side wall 121a of the housing 120 includes a first side wall 121a1 adjacent to the peripheral device 170, and the first side wall 121a1 is thicker than the sheet-shaped member 122 and the bottom wall 121b. Since the portion of the housing 120 corresponding to the peripheral device 170 is not easily deformed, damage to the peripheral device 170 is reduced.

An inner surface 121b1 of the bottom wall 121b has a step portion 121e that allows the position where the module stacked body 130 is provided to be lower than the position where the peripheral device 170 is provided. In this configuration, the module stacked body 130 and the peripheral device 170 can be accurately arranged at predetermined positions. Further, it is possible to suppress the deviation in position of the module stacked body 130 in the horizontal direction. For this reason, the contact between the module stacked body 130 and the peripheral device 170 is suppressed. Accordingly, damage and short circuits in the power storage module 140 are reduced.

The thickness of the bottom wall 121b at the position where the module stacked body 130 is provided is smaller than the thickness of other portions of the bottom wall 121b. In this case, the bottom wall 121b is easily deformed at the position where the module stacked body 130 is provided. For this reason, the module stacked body 130 is easily constrained by the deformation of the housing 120 due to the pressure difference between the inside and the outside of the internal space S1.

The housing 120 is provided with the decompression pump 124 for decompressing the internal space S1 with respect to atmospheric pressure. The power storage device

102 can be packaged in a state where the inside of the internal space S1 is decompressed. However, it is considered that the decompressed body inside the internal space S1 cannot be maintained due to secular change or the like, and the constraint load applied to the module stacked body 130 is reduced. In the power storage device 102 of an example, since the decompressed state inside the internal space S1 is maintained by the decompression pump 124, the constraint load applied to the module stacked body 130 can be maintained.

REFERENCE SIGNS LIST

1: power storage device, 2: module stacked body, 3: case (housing body), 3b: side wall, 3c: bottom wall, 4: housing, 5: cover (lid), 5b: central portion, 5c: connection portion (easily-deformable portion), 11: power storage module, 40: intermediate member, SS: sealed space (first sealed space), SS2: sealed space (second sealed space).

The invention claimed is:

1. A power storage device comprising:
   a module stacked body including at least one power storage module including a plurality of stacked electrodes; and
   a housing constituting a first sealed space for accommodating the module stacked body,
   wherein the housing includes:
       a housing body including a cylindrical side wall extending-along a stacking direction of the module stacked body and a plate-shaped bottom wall closing one end of the side wall, and
       a lid closing the other end of the side wall, wherein the lid includes a plate-shaped central portion and a deformable portion formed on a peripheral edge of the central portion, and a plate thickness of the deformable portion is smaller than a plate thickness of the central portion, and
   the housing constrains the module stacked body in the stacking direction of the electrode inside the first sealed space by deforming at least a portion of the bottom wall and the lid of the housing, so that the bottom wall and the lid become closer to each other due to an air pressure difference between the inside and outside of the first sealed space.

2. The power storage device according to claim 1, further comprising an intermediate member arranged between an inner wall surface of the housing and the module stacked body,
   wherein the intermediate member has a deformable package having a second sealed space inside,
   wherein the second sealed space contains a fluid.

3. The power storage device according to claim 2,
   wherein the fluid includes at least gas, and
   wherein a first air pressure of the first sealed space is lower than a second air pressure of the second sealed space.

4. The power storage device according to claim 1,
   wherein the deformable portion has a lower stiffness than the central portion.

5. The power storage device according to claim 1, wherein the lid includes a peripheral edge portion surrounding a peripheral edge of the deformable portion, and
   wherein the deformable portion connects the peripheral edge portion to the central portion and is inclined upward from an inner edge of the peripheral edge portion to the peripheral edge of the central portion.

6. The power storage device according to claim 1, wherein an adsorbent adsorbing gas is provided inside the first sealed space.

7. The power storage device according to claim 1, wherein an electronic device electrically connected to the module stacked body is arranged in the first sealed space.

8. The power storage device according to claim 7, wherein a dimension of the electronic device in the stacking direction is smaller than a dimension in the stacking direction between portions of the bottom wall and the lid constraining the module stacked body.

9. The power storage device according to claim 7, where the side wall of the housing includes a first side wall adjacent to the electronic device, and wherein the first side wall is thicker than the lid and the bottom wall.

10. The power storage device according to claim 7, wherein an inner surface of the bottom wall has a step difference allowing a position where the module stacked body is provided to be lower than a position where the electronic device is provided.

11. The power storage device according to claim 7, wherein the electronic device is connected to a plurality of first terminals connected to the module stacked body and a plurality of second terminals connected to an outside of the housing, and wherein the number of the plurality of second terminals is smaller than a total number of the plurality of first terminals.

12. The power storage device according to claim 1, where the side wall of the housing is provided with a valve opening when a pressure of the first sealed space becomes equal to or higher than an atmospheric pressure.

13. The power storage device according to claim 1, wherein a thickness of the bottom wall at a position where the module stacked body is provided is smaller than a thickness of other portions of the bottom wall.

14. The power storage device according to claim 1, wherein the housing is provided with a decompression pump for decompressing the first sealed space with respect to an atmospheric pressure.

15. The power storage device according to claim 1, wherein the module stacked body has a heat exchanger including a flow path through which a cooling fluid passes, wherein the flow path is connected to a supply pipe through the housing, and wherein the cooling fluid through the supply pipe circulates between the heat exchanger and an outside of the housing.

16. The power storage device according to claim 1, wherein the lid includes a peripheral edge portion surrounding a peripheral edge of the deformable portion, and the plate thickness of the deformable portion is smaller than a plate thickness of the peripheral edge portion.

* * * * *